US012340089B2

(12) United States Patent
He et al.

(10) Patent No.: US 12,340,089 B2
(45) Date of Patent: Jun. 24, 2025

(54) DISK ARRAY REDUNDANCY METHOD AND SYSTEM, COMPUTER EQUIPMENT AND STORAGE MEDIUM

(71) Applicant: SUZHOU METABRAIN INTELLIGENT TECHNOLOGY CO., LTD., Jiangsu (CN)

(72) Inventors: Kun He, Jiangsu (CN); Hongyu Zhu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,307

(22) PCT Filed: Jul. 28, 2023

(86) PCT No.: PCT/CN2023/109739
§ 371 (c)(1),
(2) Date: Jun. 26, 2024

(87) PCT Pub. No.: WO2024/022469
PCT Pub. Date: Feb. 1, 2024

(65) Prior Publication Data
US 2024/0419333 A1 Dec. 19, 2024

(30) Foreign Application Priority Data
Jul. 28, 2022 (CN) .......................... 202210895183.2

(51) Int. Cl.
*G06F 3/06* (2006.01)
(52) U.S. Cl.
CPC .......... *G06F 3/0614* (2013.01); *G06F 3/0653* (2013.01); *G06F 3/0689* (2013.01)

(58) Field of Classification Search
CPC .... G06F 3/06; G06F 11/3034; G06F 11/3037; G06F 11/3055; G06F 11/2094;
(Continued)

(56) References Cited

U.S. PATENT DOCUMENTS 6,397,347 B1   5/2002  Masuyama et al.
10,521,304 B1* 12/2019 Reddy ................... G06F 3/0619
(Continued)

FOREIGN PATENT DOCUMENTS

CN   101561773 A   10/2009
CN   101609420 A   12/2009
(Continued)

OTHER PUBLICATIONS

International Search Report and Written Opinion received for PCT Application No. PCT/CN2023/109739 mailed on Oct. 5, 2023 (9 pages including English Translation).
(Continued)

*Primary Examiner* — Khoa D Doan
(74) *Attorney, Agent, or Firm* — Merchant & Gould P.C.

(57) ABSTRACT

Disclosed are a disk array redundancy method and system. The method includes: monitoring a running state of a disk array, and sending abnormal information to a state machine in response to a monitored abnormal running state of the disk array to start a timer according to a preset redundancy duration; sending a silent request to an agent to execute silent processing to suspend input and output operations of the disk array, and switching from a normal running mode to a temporary running mode; sending a silent recovery request to the agent to execute silent recovery processing to recover the input and output operations; and after the silent recovery processing is completed, switching a running mode to the normal running mode in response to the fact that
(Continued)

timing time of a timer does not exceed a present redundancy duration and the running state is recovered to be normal.

19 Claims, 5 Drawing Sheets

(58) Field of Classification Search
CPC ............. G06F 11/1469; G06F 11/2069; G06F 11/2092; G06F 11/2097; G06F 11/2071; G06F 11/2023; G06F 11/2082; G06F 11/1461; G06F 11/1448; G06F 11/20; G06F 11/1666; G06F 11/1658; G06F 11/1662; G06F 11/2048; G06F 11/2035; G06F 11/2038; G06F 11/2056; G06F 11/205
See application file for complete search history.

(56) References Cited

U.S. PATENT DOCUMENTS

| | | | |
|---|---|---|---|
| 10,719,419 B2* | 7/2020 | Keremane | G06F 3/0604 |
| 10,949,314 B2* | 3/2021 | Gong | G06F 11/2094 |
| 11,099,934 B2* | 8/2021 | Zhou | G06F 11/2066 |
| 2003/0088803 A1* | 5/2003 | Arnott | G06F 11/1076 |
| | | | 714/E11.034 |
| 2012/0047325 A1 | 2/2012 | Sakuma et al. | |
| 2013/0110909 A1 | 5/2013 | Dean | |

FOREIGN PATENT DOCUMENTS

| | | |
|---|---|---|
| CN | 103019894 A | 4/2013 |
| CN | 103365605 A | 10/2013 |
| CN | 110413225 A | 11/2019 |
| CN | 110908613 A | 3/2020 |
| CN | 112181298 A | 1/2021 |
| CN | 114020516 A | 2/2022 |
| CN | 114968129 A | 8/2022 |
| JP | 2000293314 A | 10/2000 |
| JP | 2010244130 A | 10/2010 |

OTHER PUBLICATIONS

Chinese Search Report for CN Application No. 2022108951832 (3 pages).

* cited by examiner

DISK ARRAY REDUNDANCY METHOD AND SYSTEM, COMPUTER EQUIPMENT AND STORAGE MEDIUM

CROSS-REFERENCE TO RELATED APPLICATION

This application is a National Stage Application of International Application No. PCT/CN2023/109739 filed on Jul. 28, 2023, which claims the benefit of Serial No. 202210895183.2 filed on Jul. 28, 2022 in China, and which applications are incorporated herein by reference. To the extent appropriate, a claim of priority is made to each of the above disclosed applications.

TECHNICAL FIELD

The present disclosure relates to the field of disk arrays, in particular to a disk array redundancy method and system, a computer device and a storage medium.

BACKGROUND

In a storage system, RAIDs (Redundant Array of Independent Disks) combine multiple hard disk devices into a disk array with larger capacity and better security, and cut data into multiple segments to be respectively stored in different physical hard disk devices. Then, a scattered read-write technology is used to improve the overall performance of the disk array, and at the same time, multiple copies of important data are synchronized to different physical hard disk devices, thereby taking a very good effect of data redundancy backup.

However, the inventor realizes that in the process of using the RAIDs, various faults, such as disk faults, link faults and inter-frame node faults, will inevitably occur. These faults will cause the number of off-line disks to exceed the number of redundancy disks, which will further cause hard disks to be temporarily off-line or frequently on-line and off-line. Although the RAIDs provide a fault-tolerant mechanism and performance to a certain extent, there is no guarantee that services are always on-line, that is, when the number of off-line disks in the RAIDs exceeds the number of redundancy disks, the disks are off-line, which will cause front-end services to be stopped and directly cause service downtime, resulting in a catastrophic fault for some key industries such as finance and communications.

SUMMARY

According to one aspect, the present disclosure provides a disk array redundancy method, including:
  monitoring a running state of a disk array in real time, and sending abnormal information to a state machine in response to a monitored abnormal running state of the disk array so as to start a timer for timing according to a preset redundancy duration through the state machine;
  sending, by the state machine, a silent request to an agent to enable the agent to execute silent processing so as to suspend input and output operations of the disk array, and switching from a normal running mode of the disk array to a temporary running mode through the agent;
  sending, by the state machine, a silent recovery request to the agent to enable the agent to execute silent recovery processing so as to recover the input and output operations of the disk array; and
  after the silent recovery processing is completed, switching a running mode of the disk array to the normal running mode through the agent in response to the fact that timing time of the timer does not exceed the preset redundancy duration and the running state of the disk array is recovered to be normal.

In some of embodiments, the sending abnormal information to a state machine in response to a monitored abnormal running state of the disk array so as to start a timer for timing according to a preset redundancy duration through the state machine includes:
  sending the abnormal information to the state machine in response to the monitored abnormal running state of the disk array, and informing operation and maintenance personnel of the abnormal information; and
  setting a flag state of the state machine as a disc forming abnormal state, starting the timer for timing according to the preset redundancy duration, and informing the operation and maintenance personnel that the timing has been started.

In some of embodiments, the sending, by the state machine, a silent request to an agent to enable the agent to execute silent processing so as to suspend input and output operations of the disk array, and switching from a normal running mode of the disk array to a temporary running mode through the agent includes:
  sending a silent request to the agent, and preparing mode change data by the state machine;
  executing, by the agent, the silent processing to enable a host to suspend issuing input and output operations, adding the issued input and output operations to a silent queue, and sending a silent operation completion message to the state machine after the agent completes executing the silent processing; and
  sending, by the state machine, the mode change data to the agent, and switching, by the agent, the normal running mode of the disk array from the normal running mode to the temporary running mode according to the mode change data.

In some of embodiments, the sending, by the state machine, a silent recovery request to the agent to enable the agent to execute silent recovery processing so as to recover the input and output operations of the disk array includes:
  sending a message of switching from the normal running mode of the disk array to the temporary running mode to the state machine, and sending, by the state machine, the silent recovery request to the agent; and
  executing, by the agent, the silent recovery processing to recover the input and output operations in the silent queue to a normal queue, enabling the host to continue to issue the input and output operations, and sending a message of recovering the input and output operations to be normal in the temporary running mode to the state machine after the input and output operations are recovered to be normal in the temporary running mode.

In some of embodiments, after the sending a message of recovering the input and output operations to be normal in the temporary running mode to the state machine, the method further includes:
  acquiring the running state of the disk array, and switching from the temporary running mode of the disk array to the normal running mode through the agent in response to the fact that the running state of the disk array is recovered to be normal and the timing time of the timer does not exceed the preset redundancy duration; and switching from the temporary running mode of the disk array to an off-line running mode through the agent in response to the fact that the running state of the disk array is not recovered to be normal or the timing time of the timer exceeds the preset redundancy duration.

In some of embodiments, the switching from the temporary running mode of the disk array to the normal running mode through the agent includes:

sending a silent request to the agent, and preparing mode change data by the state machine;

executing, by the agent, the silent processing to enable a host to suspend issuing input and output operations, adding the issued input and output operations to a silent queue, and sending a silent operation completion message to the state machine after the agent completes executing the silent processing; and sending, by the state machine, the mode change data to the agent, and switching, by the agent, the running mode of the disk array from the temporary running mode to the normal running mode according to the mode change data.

In some of embodiments, the switching from the temporary running mode of the disk array to the normal running mode through the agent further includes:

sending a message of switching from the temporary running mode of the disk array to the normal running mode to the state machine, and sending, by the state machine, the silent recovery request to the agent; and executing, by the agent, the silent recovery processing to recover the input and output operations in the silent queue to a normal queue, enabling the host to continue to issue the input and output operations, and sending a message of recovering the input and output operations to be normal in the normal running mode to the state machine after the input and output operations are recovered to be normal in the normal running mode; and setting a flag state of the state machine as a disc forming normal state.

In some of embodiments, the switching from the temporary running mode of the disk array to an off-line running mode through the agent includes:

sending a silent request to the agent, and preparing mode change data by the state machine;

executing, by the agent, silent processing to enable the host to stop issuing input and output operations, adding the issued input and output operations to a silent queue, and sending a silent operation completion message to the state machine after the agent completes executing the silent processing; and sending, by the state machine, the mode change data to the agent, and switching, by the agent, the running mode of the disk array from the temporary running mode to the off-line running mode according to the mode change data.

In some of embodiments, the switching from the temporary running mode of the disk array to an off-line running mode through the agent further includes:

sending a message of switching from the temporary running mode of the disk array to the off-line running mode to the state machine, and sending, by the state machine, a silent recovery request to the agent;

executing, by the agent, silent recovery processing, returning all input and output operation requests to the host, and disconnecting a main link of the host; and reporting a disc forming abnormal state of the state machine to the operation and maintenance personnel.

In some of embodiments, the abnormal running state of the disk array means that the number of disks in an off-line state in the disk array exceeds the number of redundancy disks.

In some of embodiments, before starting the timer for timing according to the preset redundancy duration, the method further includes:

determining a preset redundancy duration database according to a fault type of the disk array, an input and output operation processing duration and a disk insertion-removal duration.

In some of embodiments, before starting the timer for timing according to the preset redundancy duration, the method further includes:

acquiring a corresponding preset redundancy duration from the preset redundancy duration database according to the fault type.

According to another aspect, the present disclosure provides a disk array redundancy system, including:

a disk management terminal, configured to monitor a running state of a disk array in real time and send abnormal information to a state machine in response to an abnormal running state of the disk array;

a state machine, configured to start a timer for timing according to a preset redundancy duration, send a silent request or a silent recovery request to an agent, and judge whether timing time of the timer exceeds the preset redundancy duration or not; and the agent, configured to execute silent processing or silent recovery processing, and switch a running mode of the agent.

According to yet another aspect, the present disclosure provides a computer device, including one or more memories, one or more processors, and computer-readable instructions stored on the one or more memories and executable on the one or more processors, and when the one or more processors execute the computer-readable instructions, the steps of the disk array redundancy method are implemented.

According to still yet another aspect, the present disclosure provides a non-transitory computer-readable storage medium, the non-transitory computer-readable storage medium stores computer-readable instructions, and when the computer-readable instructions are executed by one or more processors, the steps of the disk array redundancy method are implemented.

BRIEF DESCRIPTION OF THE DRAWINGS

In order to more clearly illustrate the technical solutions in the embodiments of the present disclosure, the drawings required to be used in the description of the embodiments are briefly introduced below. Obviously, the drawings in the description below are merely some embodiments of the present disclosure, and those skilled in the art can also obtain other drawings according to these drawings without creative work.

DETAILED DESCRIPTION OF THE EMBODIMENTS

In order to make the purpose, technical solution and advantages of the present disclosure clearer, the present disclosure will be further illustrated in detail below with reference to the drawings and embodiments. It should be understood that the specific embodiments described herein are merely illustrative of the present disclosure and are not intended to limit the present disclosure.

In the process of using RAIDs, various faults, such as disk faults, link faults and inter-frame node faults, will inevitably occur. These faults will cause the number of off-line disks to exceed the number of redundancy disks, which will further cause hard disks to be temporarily off-line or frequently on-line and off-line. Although the RAIDs provide a fault-tolerant mechanism and performance to a certain extent, there is no guarantee that services are always on-line, that is, when the number of off-line disks in the RAIDs exceeds the number of redundancy disks, the disks are off-line, which will cause front-end services to be stopped and directly cause service downtime, resulting in a catastrophic fault for some key industries such as finance and communications. Aiming at the technical problem, this paper provides a disk array redundancy method and system, a computer device, and a storage medium A disk array with an abnormal running state enters a temporary running mode without disconnecting the services, so that the normal operation of the services can be ensured; and a preset redundancy duration is set for the temporary running mode, so that the normal operation of the services can be ensured in the preset redundancy duration, and the disk array may be automatically recovered to a normal running mode after the disk array is recovered to be normal in the preset redundancy duration, so that the redundancy capability of the disk array is improved, and the normal operation of the services is ensured.

Figure 1:
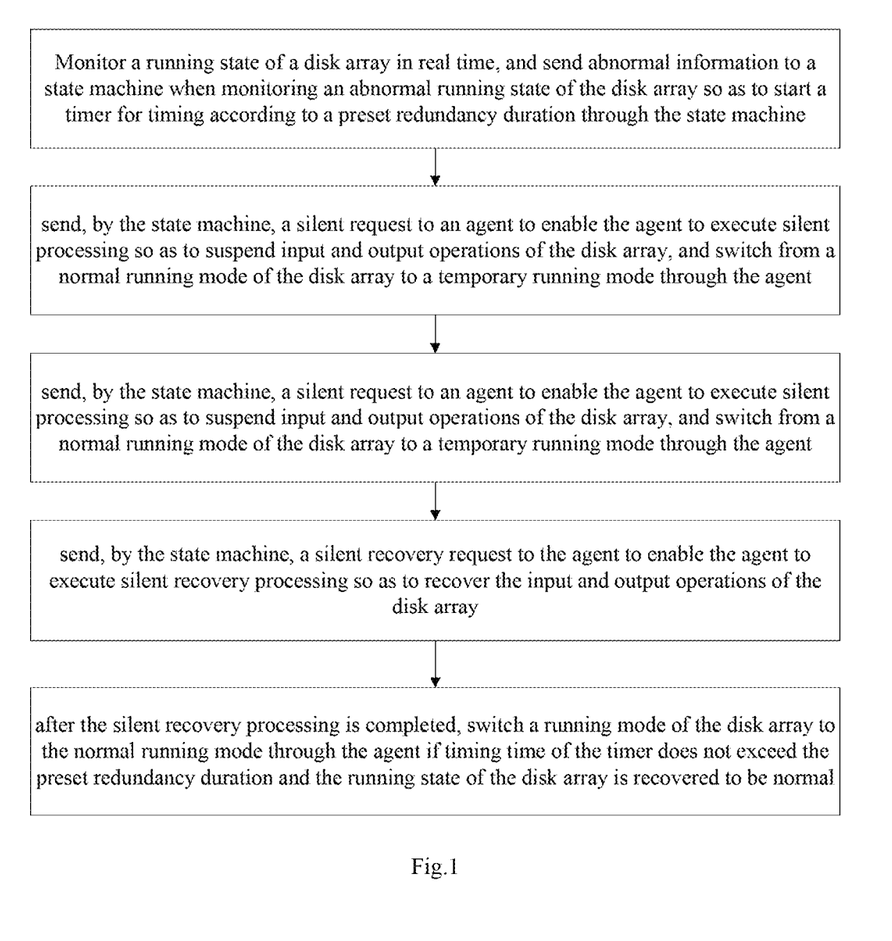
FIG. 1 is a flowchart of a first disk array redundancy method in one or more embodiments of the present disclosure.
Figure 2:
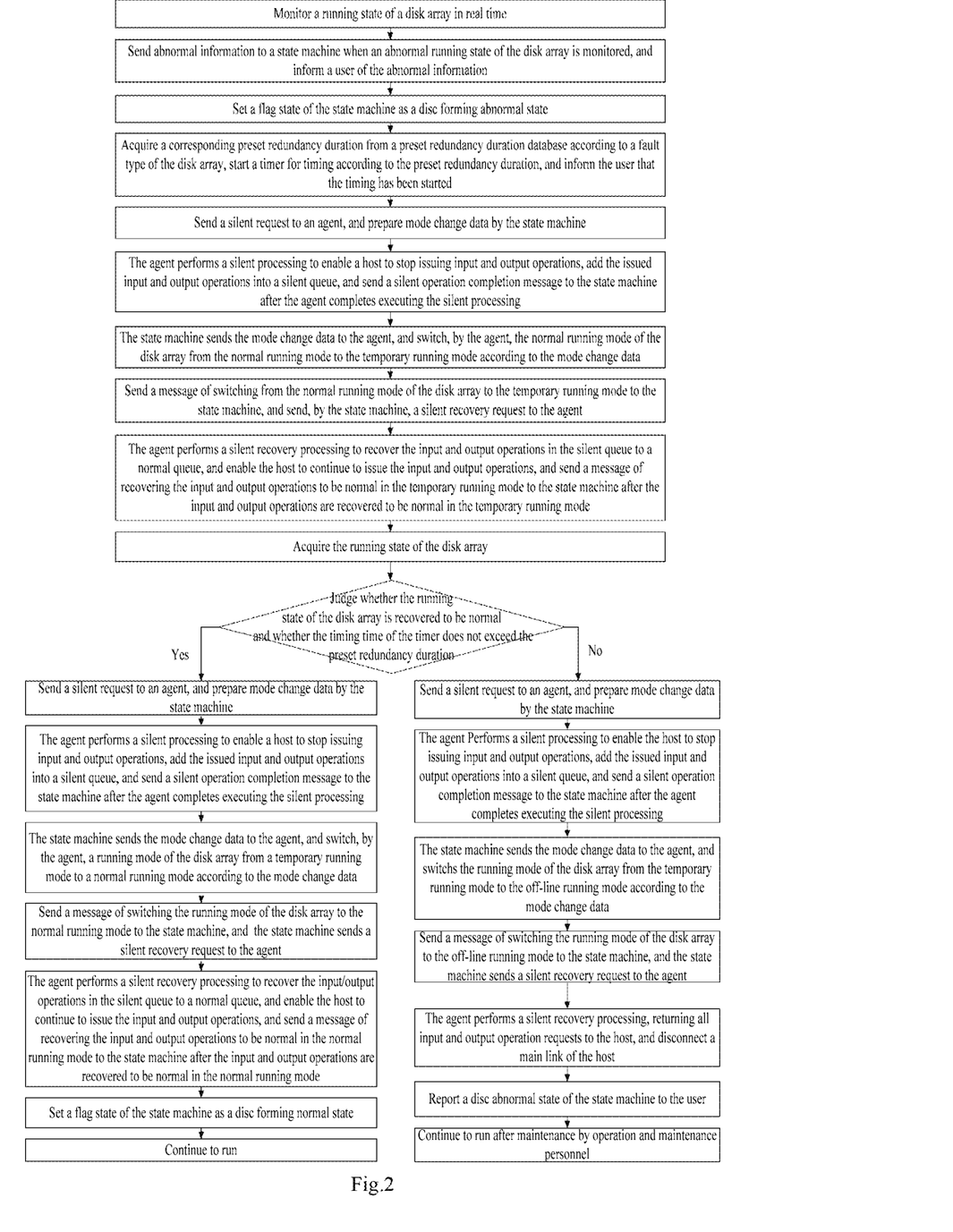
FIG. 2 is a flowchart of a second disk array redundancy method in one or more embodiments of the present disclosure.
Figure 3:
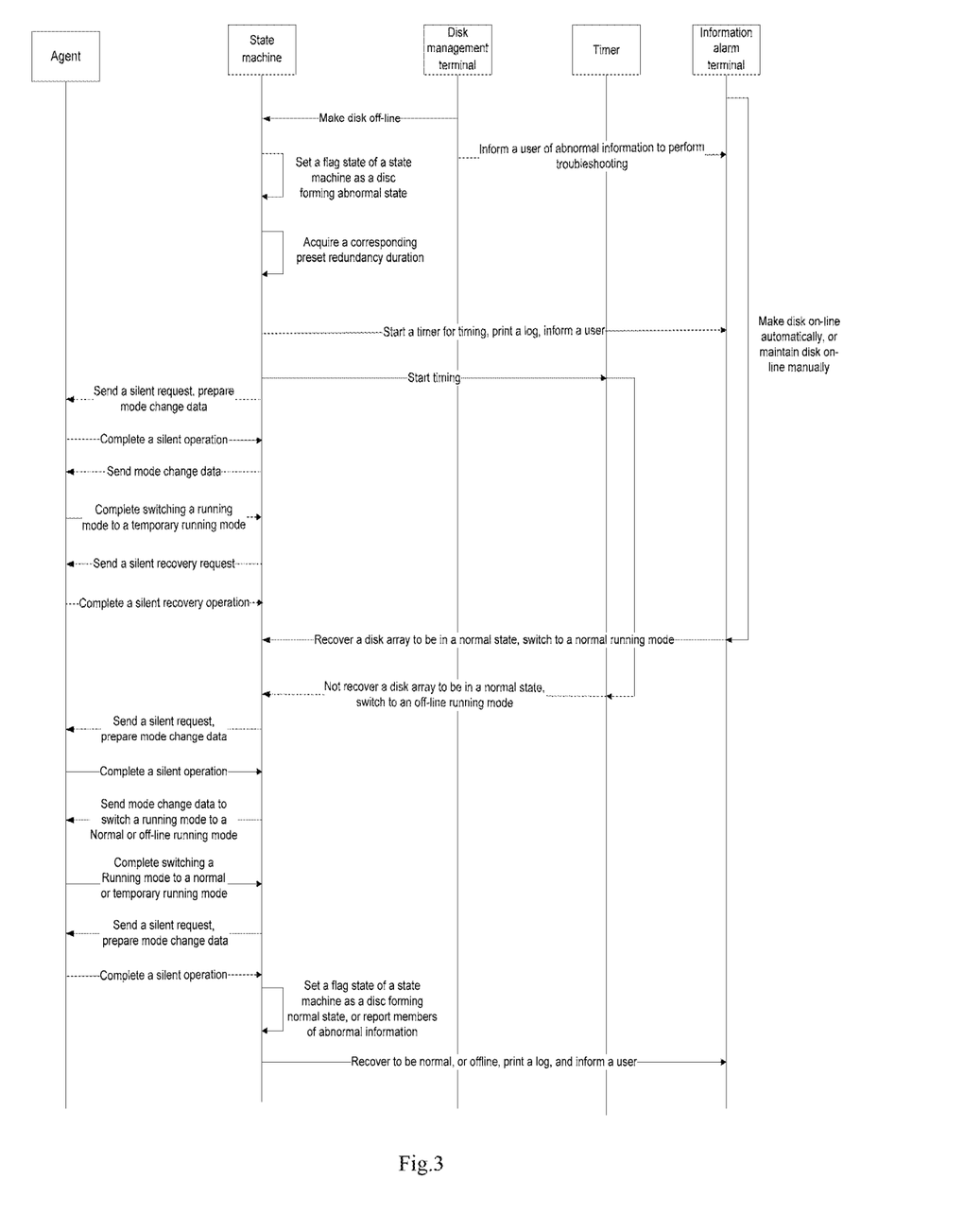
FIG. 3 is a timing diagram of a disk array redundancy method in one or more embodiments of the present disclosure.

The disk array redundancy method of the present disclosure is referred to FIGS. 1 to 3. FIG. 1 is a flowchart of a first disk array redundancy method according to the present disclosure. FIG. 2 is a flowchart of a second disk array redundancy method according to the present disclosure. FIG. 3 is a timing diagram of a disk array redundancy method according to the present disclosure.

The disk array redundancy method includes the following steps:

Monitor a running state of a disk array in real time, and send abnormal information to a state machine when monitoring an abnormal running state of the disk array so as to start a timer for timing according to a preset redundancy duration through the state machine, where the disk array is provided with redundancy disks, and when the disk array fails to cause the number of off-line disks to exceed the number of the redundancy disks, the running state of the disk array will be in an abnormal state (for example, an RAID 6 disk array is provided with two redundancy disks, and when the number of off-line disks in the RAID 6 disk array exceeds 2, the RAID 6 disk array is in an abnormal state), so that it is necessary to monitor the disk array in real time to monitor the running state of the disk array. When the abnormal running state of the disk array is monitored, an abnormal message of the disk array is sent to the state machine, so that the state machine starts a timing function of a timer, and monitors a relationship between timing time of the state machine and the preset redundancy duration, so as to switch the running mode of the disk array through the relationship between the two.

sending, by the state machine, a silent request to an agent to enable the agent to execute silent processing so as to suspend input and output operations of the disk array, and switching from a normal running mode of the disk array to a temporary running mode through the agent;

where after the state machine starts the timing function of the timer, the state machine will send the silent request to the agent to enable the agent to execute the silent processing (the silent processing means that the input and output operations of the disk array in a current running mode are suspended), at the moment, the input and output operations of the disk array in the normal running mode are suspended), and then the running mode of the disk array is switched to the temporary running mode through the agent, so that the input and output operations can be processed when the disk array is abnormal, however, the processed input and output operation amount of the disk array in the temporary running mode is reduced, but the normal operation of the services can still be guaranteed.

Send, by the state machine, a silent recovery request to the agent to enable the agent to execute silent recovery processing so as to recover the input and output operations of the disk array, where after the agent switches the running mode of the disk array to the temporary running mode, the state machine sends the silent recovery request to the agent (the silent recovery request means that the disk array executes the input and output operations according to a running mode to be switched), and at the moment, the disk array executes the input and output operations according to the temporary running mode, so that the disk array in an abnormal state can ensure the normal operation of the services.

After the silent recovery processing is completed, switch a running mode of the disk array to the normal running mode through the agent if timing time of the timer does not exceed the preset redundancy duration and the running state of the disk array is recovered to be normal, where after completing executing the silent recovery processing, the agent needs to monitor the running state of the disk array, and the running mode of the agent needs to be switched to the normal running mode if the running state of the disk array is recovered to be normal and the timing time of the timer does not exceed the preset redundancy duration. During the preset redundancy duration, the off-line disks in the disk array will be automatically recovered to be on-line, or operation and maintenance personnel manually overhaul the disk array, so that the off-line disks in the disk array are recovered to be on-line. In a word, during the preset redundancy duration, as long as the running state of the disk array is recovered to be normal and the timing time of the timer does not exceed the preset redundancy duration, the running mode of the disk array may be switched back to the normal running mode, the normal input and output operations of the disk array are recovered, and the normal service of the disk array is recovered, thereby effectively improving the redundancy capability of the disk array.

In one of implementations, the sending abnormal information to a state machine when monitoring an abnormal running state of the disk array so as to start a timer for timing according to a preset redundancy duration through the state machine includes:

Send the abnormal information to the state machine when the abnormal running state of the disk array is monitored, and inform operation and maintenance personnel of the abnormal information, where the running state of the disk array is monitored in real time, a message that the disk array is abnormal is sent to the state machine when the abnormal running state of the disk array is monitored so as to start a timing function of the timer by the state machine, and the operation and maintenance personnel are informed of the abnormal information, so that the operation and maintenance personnel perform troubleshooting to recover off-line disks in the disk array. in addition, a log is printed to save operation information.

Set a flag state of the state machine as a disc forming abnormal state, start the timer for timing according to the preset redundancy duration, and inform the operation and maintenance personnel that the timing has been started, where the state machine is provided with a flag state for identifying the running state of the disk array; after the state machine receives the abnormal information of the disk array, the flag state of the state machine is automatically set as the disc forming abnormal state, that is, an off-line state of disks in the disk array; and then the state machine automatically starts the timing function of the timer, and judges a relationship between timing time of the timer and the preset redundancy duration at all times so as to judge a running mode to which the disk array is switched through the relationship between the timing time of the timer and the preset redundancy duration; and in addition, the operation and maintenance personnel are informed that timing has been started.

In one of implementations, the sending, by the state machine, a silent request to an agent to enable the agent to execute silent processing so as to suspend input and output operations of the disk array, and switching from a normal running mode of the disk array to a temporary running mode through the agent includes:

Send a silent request to the agent, and prepare mode change data by the state machine, where after the timing function of the timer is started by the state machine, the state machine automatically sends the silent request to the agent, and prepares the mode change data. The disk array executes an input and output operation request according to the normal running mode, which needs to be executed according to normal running mode data; the disk array executes the input and output operation request according to the, which needs to be executed according to temporary operation mode data; the disk array executes the input and output operation request according to the off-line operation mode, which needs to be executed according to temporary off-line operation mode data, and therefore, it is necessary to prepare the mode change data before the switching of the running mode of the disk array needs to be executed. For example, the current running mode of the disk array is the normal running mode. Before the current running mode of the disk array will be switched to the temporary running mode, it is necessary to prepare the mode change data for switching from the normal running mode to the temporary running mode.

Execute, by the agent, the silent processing to enable a host to suspend issuing input and output operations, add the issued input and output operations to a silent queue, and send a silent operation completion message to the state machine after the agent completes executing the silent processing, where after receiving the silent request of the state machine, the agent executes the silent processing, that is, stops input and output operations issued by the host in the normal running mode of the disk array, and the issued input and output operations are added to the silent queue; and the silent operation completion message is returned to the state machine after the silent processing execution is completed.

Send, by the state machine, the mode change data to the agent, and switch, by the agent, the running mode of the disk array from the normal running mode to the temporary running mode according to the mode change data, where after receiving the silent operation completion message, the state machine sends the mode change data to the agent, and the agent switches the running mode of the disk array according to the mode change data, and switches from the normal running mode of the disk array to the temporary running mode so as to execute the input and output operations in the temporary running mode without disconnecting the services, thereby effectively improving the redundancy capability of the disk array.

In one of implementations, the sending, by the state machine, a silent recovery request to the agent to enable the agent to execute silent recovery processing so as to recover the input and output operations of the disk array includes:

Send a message of switching from the normal running mode of the disk array to the temporary running mode to the state machine, and send, by the state machine, the silent recovery request to the agent, where after switching from the normal running mode of the disk array to the temporary running mode, the agent sends the message of switching from the normal running mode of the disk array to the temporary running mode to the state machine, after the state machine receives the message, the switching of the running mode of the disk array is completed by default, then the state machine sends the silent recovery quest to the agent so as to recover silence, and the disk array executes the input and output operations according to the switched running mode.

Execute, by the agent, the silent recovery processing to recover the input and output operations in the silent queue to a normal queue, and enable the host to continue to issue the input and output operations, and send a message of recovering the input and output operations to be normal in the temporary running mode to the state machine after the input and output operations are recovered to be normal in the temporary running mode, where after receiving the silent recovery request of the state machine, the agent recovers the input and output operations in the silent queue to a normal queue in the temporary running mode, that is, the input and output operations in the silent queue are normally executed according to the switched running mode of the disk array, and the host recovers the issuing of the input and output operations, and the input and output operations are all normally executed according to the switched running mode of the disk array; and a message of recovering the input and output operations to be normal is returned to the state machine after the input and output operations are recovered to be normal.

In one of implementations, after the sending a message of recovering the input and output operations to be normal in the temporary running mode to the state machine, the method further includes:

acquire a running state of the disk array, and switch from the temporary running mode of the disk array to the normal running mode through the agent if the running state of the disk array is recovered to be normal and the timing time of the timer does not exceed the preset redundancy duration, where after the state machine receives the message that the input and output operations are recovered to be normal, the running state of the disk array is acquired, and whether the state of the disk array is normal or not is judged, and whether the timing time of the timer exceeds the preset redundancy duration or not is judged; if the running state of the disk array is recovered to be normal and the timing time of the timer does not exceed the preset redundancy duration, it indicates that the off-line disks in the disk array have been automatically on-line, or the operation and maintenance personnel have manually put the off-line disks on-line, that is, if the disk array has been recovered to be in a normal state, the temporary running mode of the disk array needs to be switched to the normal running mode through the agent, the input and output operations are executed according to the normal running mode, and the processed services of the disk array are recovered to be normal.

Switch from the temporary running mode of the disk array to the off-line running mode through the agent if the running state of the disk array is not recovered to be normal or the timing time of the timer exceeds the preset redundancy duration, where if the running state of the disk array is not recovered to be normal or the timing time of the timer exceeds the preset redundancy duration, it indicates that the disk array cannot normally execute the input and output operations according to the temporary running mode, cannot be recovered to the normal running mode, and cannot normally execute the service processing, the temporary running mode of the disk array needs to be switched to the off-line running mode through the agent, and a message needs to be sent to the operation and maintenance personnel to maintain the disk array in the off-line running mode in time.

In one of implementations, the switching from the temporary running mode of the disk array to the normal running mode through the agent includes:

Send a silent request to the agent, and prepare mode change data by the state machine, where after the timing function of the timer is started by the state machine, the state machine automatically sends the silent request to the agent, and before the switching of the running mode of the disk array needs to be executed, the state machine prepares the mode change data (the mode change data are mode change data for switching from the temporary running mode of the disk array to the normal running mode).

Execute, by the agent, the silent processing to enable a host to suspend issuing input and output operations, add the issued input and output operations to a silent queue, and send a silent operation completion message to the state machine after the agent completes executing the silent processing, where after receiving the silent request of the state machine, the agent executes the silent processing, that is, stops input and output operations issued by the host in the temporary running mode of the disk array, and the issued input and output operations are added to the silent queue; and the silent operation completion message is returned to the state machine after executing the silent processing is completed.

Send, by the state machine, the mode change data to the agent, and switch, by the agent, the running mode of the disk array from the temporary running mode to the normal running mode according to the mode change data, where after receiving the silent operation completion message, the state machine sends the mode change data for switching from the temporary running mode of the disk array to the normal running mode to the agent, and the agent switches the running mode of the disk array according to the mode change data, and switches from the temporary running mode of the disk array to the normal running mode so as to recover the normal running mode, executes the input and output operations and recovers the service processing capability, thereby effectively improving the redundancy capability of the disk array.

In one of implementations, the switching from the temporary running mode of the disk array to the normal running mode through the agent further includes:

sending a message of switching from the temporary running mode of the disk array to the normal running mode to the state machine, and sending, by the state machine, the silent recovery request to the agent; and where after switching from the temporary running mode of the disk array to the normal running mode, the agent sends the message of switching from the temporary running mode of the disk array to the normal running mode to the state machine, after the state machine receives the message, the switching of the running mode of the disk array is completed by default, then the state machine sends the silent recovery quest to the agent so as to recover silence, and the disk array executes the input and output operations according to the switched normal running mode.

Execute, by the agent, the silent recovery processing to recover the input and output operations in the silent queue to a normal queue, and enable the host to continue to issue the input and output operations, and send a message of recovering the input and output operations to be normal in the normal running mode to the state machine after the input and output operations are recovered to be normal in the normal running mode, where after receiving the silent recovery request of the state machine, the agent recovers the input and output operations in the silent queue to a normal queue in the normal running mode, that is, the input and output operations in the silent queue are normally executed according to the switched normal running mode of the disk array, and the host recovers the issuing of the input and output operations, and the input and output operations are all normally executed according to the switched normal running mode of the disk array; and a message of recovering the input and output operations to be normal in the normal running mode is returned to the state machine after the input and output operations are recovered to be normal.

Set a flag state of the state machine as a disc forming normal state,
    where at the moment, the running state of the disk array has been recovered to be normal, the disk array has been recovered to a normal running mode, the flag state of the state machine needs to be set as the disc forming normal state, the services are normally executed, the input and output operations are normally executed, and the disk array continues to run normally. In addition, a log is printed to save operation information.

In one of implementations, the switching from the temporary running mode of the disk array to an off-line running mode through the agent includes:

Send a silent request to the agent, and prepare mode change data by the state machine,
    where after the timing function of the timer is started by the state machine, the state machine automatically sends the silent request to the agent, and before the switching of the running mode of the disk array needs to be executed, the state machine prepares the mode change data (the mode change data are mode change data for switching from the temporary running mode of the disk array to the off-line running mode).

Execute, by the agent, silent processing to enable the host to stop issuing input and output operations, add the issued input and output operations to a silent queue, and send a silent operation completion message to the state machine after the agent completes executing the silent processing,
    where after receiving the silent request of the state machine, the agent executes the silent processing, that is, stops input and output operations issued by the host in the temporary running mode of the disk array, and the issued input and output operations are added to the silent queue; and the silent operation completion message is returned to the state machine after executing the silent processing is completed.

Send, by the state machine, the mode change data to the agent, and switch, by the agent, the running mode of the disk array from the temporary running mode to the off-line running mode according to the mode change data,
    where after receiving the silent operation completion message, the state machine sends the mode change data for switching from the temporary running mode of the disk array to the off-line running mode to the agent, and the agent switches the running mode of the disk array according to the mode change data, and switches from the temporary running mode of the disk array to the off-line running mode so as to stop all input and output operations and services.

In one of implementations, the switching from the temporary running mode of the disk array to an off-line running mode through the agent further includes:

sending a message of switching from the temporary running mode of the disk array to the off-line running mode to the state machine, and sending, by the state machine, a silent recovery request to the agent;
    where after switching from the temporary running mode of the disk array to the off-line running mode, the agent sends the message of switching from the temporary running mode of the disk array to the off-line running mode to the state machine, after the state machine receives the message, the switching of the running mode of the disk array is completed by default, then the state machine sends the silent recovery quest to the agent so as to recover silence, and the disk array executes the input and output operations according to the switched off-line running mode.

Execute, by the agent, silent recovery processing, return all input and output operation requests to the host, and disconnect a main link of the host,
    where after receiving the silent recovery request of the state machine, the agent executes the input and output operations in the silent queue according to the switched off-line running mode of the disk array, that is, stops all input and output operations and services.

Report a disc forming abnormal state of the state machine to the operation and maintenance personnel,
    where at the moment, the running state of the disk array cannot be recovered to be normal, and the flag state of the state machine needs to be set as the disc forming abnormal state to be reported to the operation and maintenance personnel. In addition, a log is printed to save operation information.

In one of implementations, the abnormal running state of the disk array means that the number of disks in an off-line state in the disk array exceeds the number of redundancy disks,
    where the abnormal state of the disk array means that the number of disks in the off-line state in the disk array exceeds the number of the redundancy disks, so that normal input and output operations and normal service processing cannot be performed In one of implementations, before starting the timer for timing according to the preset redundancy duration, the method further includes:

determining a preset redundancy duration database according to a fault type of the disk array, an input and output operation processing duration and a disk insertion-removal duration.
    where the preset redundancy durations corresponding to different fault types of the disk array are different, so that different preset redundancy durations may be set for different fault types of the disk array, and the preset redundancy durations under different fault types are stored in the database, so that the preset redundancy durations corresponding to the fault types are acquired before the timing of the timer is executed. In addition, the preset redundancy duration also takes factors such as a fault recovery duration of a controller into consideration.

In one of implementations, before starting the timer for timing according to the preset redundancy duration, the method further includes:

Acquire a corresponding preset redundancy duration from the preset redundancy duration database according to a fault type,
    where when the disk array is monitored to be in an abnormal state, the state machine judges the fault type of the disk array, acquires the corresponding preset redundancy duration from the preset redundancy duration database according to the fault type, and then starts the timer for timing according to the preset redundancy duration.

Referring to FIGS. 1 to 3, FIG. 1 is a flowchart of a first disk array redundancy method according to the present disclosure; FIG. 2 is a flowchart of a second disk array redundancy method according to the present disclosure; and FIG. 3 is a timing diagram of a disk array redundancy method according to the present disclosure.

Monitor a running state of a disk array in real time,
    where the disk array is monitored in real time to monitor the running state of the disk array in real time so as to switch a running mode of the disk array to a temporary running mode when the disk array is in abnormal state, thereby ensuring normal operation of the services.

Send the abnormal information to the state machine when the abnormal running state of the disk array is monitored, and inform operation and maintenance personnel of the abnormal information, where the running state of the disk array is monitored in real time, a message that the disk array is abnormal is sent to the state machine when the abnormal running state of the disk array is monitored so as to start a timing function of the timer by the state machine, and the operation and maintenance personnel are informed of the abnormal information, so that the operation and maintenance personnel perform troubleshooting to recover off-line disks in the disk array. In addition, when the abnormal running state of the disk array is monitored, the fault type of the disk array will be saved.

Set a flag state of the state machine as a disc forming abnormal state, where after the state machine receives the abnormal information of the disk array, the flag state of the state machine is automatically set as the disc forming abnormal state, that is, an off-line state of the disks in the disk array.

Acquire a corresponding preset redundancy duration from a preset redundancy duration database according to the fault type of the disk array, start the timer for timing according to the preset redundancy duration, and inform the operation and maintenance personnel that the timing has been started, where the state machine automatically starts the timing function of the timer, acquires the corresponding preset redundancy duration from the preset redundancy duration database according to the fault type of the disk array, and judges a relationship between timing time of the timer and the preset redundancy duration at all times so as to judge a running mode to which the disk array is switched through the relationship between the timing time of the timer and the preset redundancy duration; and in addition, the operation and maintenance personnel are informed that timing has been started.

Send a silent request to the agent, and prepare mode change data by the state machine, where after the timing function of the timer is started by the state machine, the state machine automatically sends the silent request to the agent, and prepares the mode change data. The current running mode of the disk array is the normal running mode. Before the current running mode of the disk array will be switched to the temporary running mode, it is necessary to prepare the mode change data for switching from the normal running mode to the temporary running mode.

Execute, by the agent, the silent processing to enable a host to suspend issuing input and output operations, add the issued input and output operations to a silent queue, and send a silent operation completion message to the state machine after the agent completes executing the silent processing, where after receiving the silent request of the state machine, the agent executes the silent processing, that is, stops input and output operations issued by the host in the normal running mode of the disk array, and the issued input and output operations are added to the silent queue; and the silent operation completion message is returned to the state machine after the silent processing execution is completed.

Send, by the state machine, the mode change data to the agent, and switch, by the agent, the normal running mode of the disk array from the normal running mode to the temporary running mode according to the mode change data, where after receiving the silent operation completion message, the state machine sends the mode change data to the agent, and the agent switches the running mode of the disk array according to the mode change data, and switches from the normal running mode of the disk array to the temporary running mode so as to execute the input and output operations in the temporary running mode without disconnecting the services, thereby effectively improving the redundancy capability of the disk array.

Send a message of switching from the normal running mode of the disk array to the temporary running mode to the state machine, and send, by the state machine, the silent recovery request to the agent, where after switching from the normal running mode of the disk array to the temporary running mode, the agent sends the message of switching from the normal running mode of the disk array to the temporary running mode to the state machine, after the state machine receives the message, the switching of the running mode of the disk array is completed by default, then the state machine sends the silent recovery quest to the agent so as to recover silence, and the disk array executes the input and output operations according to the switched running mode.

Execute, by the agent, the silent recovery processing to recover the input and output operations in the silent queue to a normal queue, and enable the host to continue to issue the input and output operations, and send a message of recovering the input and output operations to be normal in the temporary running mode to the state machine after the input and output operations are recovered to be normal in the temporary running mode, where after receiving the silent recovery request of the state machine, the agent recovers the input and output operations in the silent queue to a normal queue in the temporary running mode, that is, the input and output operations in the silent queue are normally executed according to the switched running mode of the disk array, and the host recovers the issuing of the input and output operations, and the input and output operations are all normally executed according to the switched running mode of the disk array; and a message of recovering the input and output operations to be normal is returned to the state machine after the input and output operations are recovered to be normal.

Acquire a running state of the disk array, and judge whether the running state of the disk array is recovered to be normal or not and whether the timing time of the timer exceeds the preset redundancy duration or not, where if the running state of the disk array is recovered to be normal and the timing time of the timer does not exceed the preset redundancy duration, the state machine sends the silent request to the agent, and prepares the mode change data; and where after the timing function of the timer is started by the state machine, the state machine automatically sends the silent request to the agent, and before the switching of the running mode of the disk array needs to be executed, the state machine prepares the mode change data (the mode change data are mode change data for switching from the temporary running mode of the disk array to the normal running mode).

Execute, by the agent, the silent processing to enable a host to suspend issuing input and output operations, add the issued input and output operations to a silent queue, and send a silent operation completion message to the state machine after the agent completes executing the silent processing;
  where after receiving the silent request of the state machine, the agent executes the silent processing, that is, stops input and output operations issued by the host in the temporary running mode of the disk array, and the issued input and output operations are added to the silent queue; and the silent operation completion message is returned to the state machine after executing the silent processing is completed.
Send, by the state machine, the mode change data to the agent, and switch, by the agent, the running mode of the disk array from the temporary running mode to the normal running mode according to the mode change data,
  where after receiving the silent operation completion message, the state machine sends the mode change data for switching from the temporary running mode of the disk array to the normal running mode to the agent, and the agent switches the running mode of the disk array according to the mode change data, and switches from the temporary running mode of the disk array to the normal running mode so as to recover the normal running mode, executes the input and output operations and recovers the service processing capability, thereby effectively improving the redundancy capability of the disk array.
  sending a message of switching from the temporary running mode of the disk array to the normal running mode to the state machine, and sending, by the state machine, the silent recovery request to the agent; and
  where after switching from the temporary running mode of the disk array to the normal running mode, the agent sends the message of switching from the temporary running mode of the disk array to the normal running mode to the state machine, after the state machine receives the message, the switching of the running mode of the disk array is completed by default, then the state machine sends the silent recovery quest to the agent so as to recover silence, and the disk array executes the input and output operations according to the switched normal running mode.
Execute, by the agent, the silent recovery processing to recover the input and output operations in the silent queue to a normal queue, and enable the host to continue to issue the input and output operations, and send a message of recovering the input and output operations to be normal in the normal running mode to the state machine after the input and output operations are recovered to be normal in the normal running mode,
  where after receiving the silent recovery request of the state machine, the agent recovers the input and output operations in the silent queue to a normal queue in the normal running mode, that is, the input and output operations in the silent queue are normally executed according to the switched normal running mode of the disk array, and the host recovers the issuing of the input and output operations, and the input and output operations are all normally executed according to the switched normal running mode of the disk array; and a message of recovering the input and output operations to be normal is returned to the state machine after the input and output operations are recovered to be normal.

Set a flag state of the state machine as a disc forming normal state,
  where at the moment, the running state of the disk array has been recovered to be normal, the disk array has been recovered to a normal running mode, and the flag state of the state machine needs to be set as the disc forming normal state.
Send the silent request to the agent, and prepare mode change data by the state machine if the running state of the disk array is not recovered to be normal or the timing time of the timer exceeds the preset redundancy duration,
  where after the timing function of the timer is started by the state machine, the state machine automatically sends the silent request to the agent, and before the switching of the running mode of the disk array needs to be executed, the state machine prepares the mode change data (the mode change data are mode change data for switching from the temporary running mode of the disk array to the off-line running mode).
Execute, by the agent, silent processing to enable the host to stop issuing input and output operations, add the issued input and output operations to a silent queue, and send a silent operation completion message to the state machine after the agent completes executing the silent processing,
  where after receiving the silent request of the state machine, the agent executes the silent processing, that is, stops input and output operations issued by the host in the temporary running mode of the disk array, and the issued input and output operations are added to the silent queue; and the silent operation completion message is returned to the state machine after executing the silent processing is completed.
Send, by the state machine, the mode change data to the agent, and switch, by the agent, the running mode of the disk array from the temporary running mode to the off-line running mode according to the mode change data,
  where after receiving the silent operation completion message, the state machine sends the mode change data for switching from the temporary running mode of the disk array to the off-line running mode to the agent, and the agent switches the running mode of the disk array according to the mode change data, and switches from the temporary running mode of the disk array to the off-line running mode so as to stop all input and output operations and services.
  sending a message of switching from the temporary running mode of the disk array to the off-line running mode to the state machine, and sending, by the state machine, a silent recovery request to the agent;
  where after switching from the temporary running mode of the disk array to the off-line running mode, the agent sends the message of switching from the temporary running mode of the disk array to the off-line running mode to the state machine, after the state machine receives the message, the switching of the running mode of the disk array is completed by default, then the state machine sends the silent recovery quest to the agent so as to recover silence, and the disk array executes the input and output operations according to the switched off-line running mode.
Execute, by the agent, silent recovery processing, return all input and output operation requests to the host, and disconnect a main link of the host,
  where after receiving the silent recovery request of the state machine, the agent executes the input and output operations in the silent queue according to the switched off-line running mode of the disk array, that is, stops all input and output operations and services.

Reporting a disc forming abnormal state of the state machine to the operation and maintenance personnel, where at the moment, the running state of the disk array cannot be recovered to be normal, and the flag state of the state machine needs to be set as the disc forming abnormal state to be reported to the operation and maintenance personnel.

It should be understood that although the various steps in the flowcharts of FIGS. 1 to 3 are shown sequentially as indicated by the arrows, these steps are not necessarily executed sequentially in the order indicated by the arrows. Unless explicitly stated herein, there is no strict order limitation to the execution of these steps, and these steps may be executed in other orders. And, at least a part of the steps in FIGS. 1 to 3 may include a plurality of sub-steps or stages, and these sub-steps or stages are not necessarily executed at the same time, but may be executed at different times, and the execution order of these sub-steps or stages is not necessarily sequential, but may be executed in turn or alternately with at least a portion of other steps or sub-steps or stages of other steps.

Figure 4:
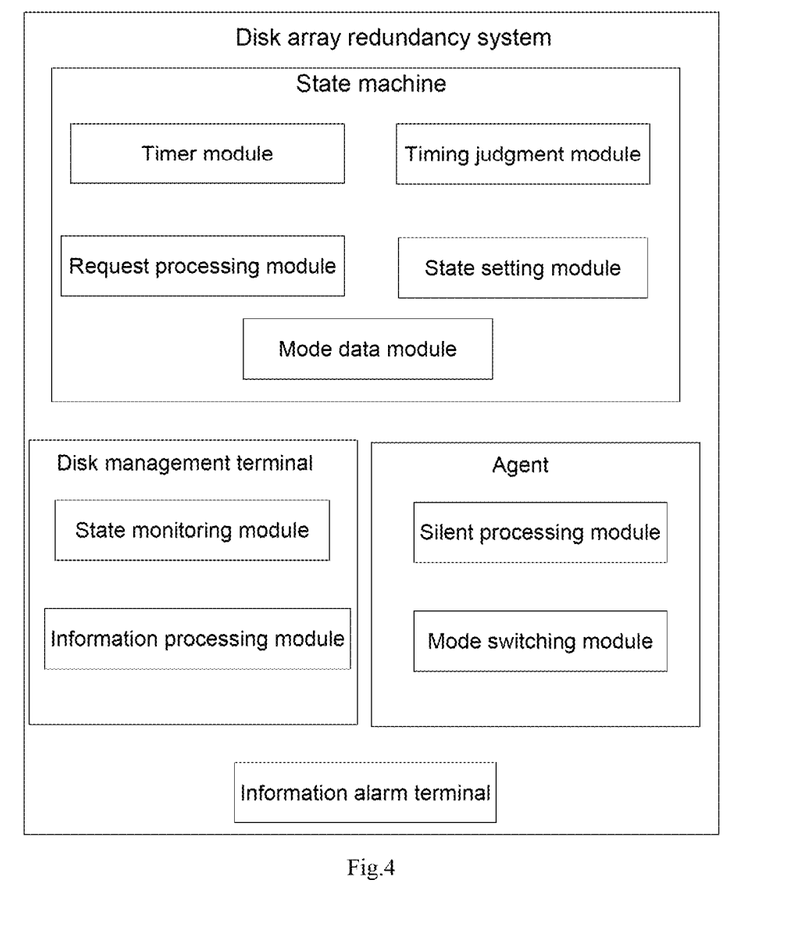
FIG. 4 is a system structure diagram of a disk array redundancy system in one or more embodiments of the present disclosure.

Referring to FIG. 4, FIG. 4 is a system structure diagram of a disk array redundancy system according to the present disclosure.

The disk array redundancy system of the present embodiment includes:
a disk management terminal, a state machine, and an agent. The disk management terminal is configured to monitor a running state of a disk array in real time and send abnormal information to the state machine when the running state of the disk array is abnormal; and
the disk management terminal includes a state monitoring module and an information processing module, where the state monitoring module is configured to monitor the running state of the disk array in real time, and the information processing module is configured to send the abnormal information to the state machine when the running state of the disk array is abnormal. The disk array is provided with redundancy disks, and when the disk array fails to cause the number of off-line disks to exceed the number of the redundancy disks, the running state of the disk array will be in an abnormal state, so that it is necessary to monitor the disk array in real time through the state monitoring module to monitor the running state of the disk array. When the abnormal running state of the disk array is monitored, an abnormal message of the disk array is sent to the state machine through the information processing module, so that the state machine starts a timing function of a timer.

The state machine is configured to start the timer for timing according to a preset redundancy duration, send a silent request or a silent recovery request to an agent, and judge whether timing time of the timer exceeds the preset redundancy duration or not; and
the state machine includes a timer module, a request processing module, and a timing judgment module, where the timer module is configured to start the timer for timing according to the preset redundancy duration; the request processing module is configured to send the silent request or the silent recovery request to the agent; and the timing judgment module is configured to judge whether the timing time of the timer exceeds the preset redundancy duration or not. The timing function of the timer is started through the timer module, and after the state machine starts the timing function of the timer, the state machine sends the silent request or the silent recovery request to the agent through the request processing module, so that the agent executes silent processing or silent recovery processing; and after a message of recovering input and output operations to be normal in the temporary running mode to the state machine, it is necessary to judge a relationship between the timing time of the timer and the preset redundancy duration, so as to determine whether it is necessary to be switched to the normal running mode or the off-line running mode subsequently according to the relationship between the two.

The agent is configured to execute the silent processing or the silent recovery processing, and switch the running mode of the disk array.

The agent includes a silent processing module and a mode switching module, where the silent processing module is configured to execute the silent processing or the silent recovery processing; and the mode switching module is configured to switch the running mode of the disk array. When the silent request of the silent recovery request sent by the state machine is received, the silent processing module executes corresponding silent processing or silent recovery processing; and in addition, the running mode of the disk array is switched through the mode switching module according to mode change data.

In one of implementations, the disk array redundancy system further includes:
an information alarm terminal, configured to send alarm information to operation and maintenance personnel.

Fault information of the disk array, timing start information of the timer, on-line recovery information of the disk and running mode switching information of the disk array are sent to the operation and maintenance personnel through the information alarm terminal.

In one of implementations, the state machine further includes:
a state setting module and a mode data module. The state setting module is configured to set a flag state of the state machine.

The flag state of the state machine is set as a disc forming abnormal state through the state setting module, or the flag state of the state machine is set as a disc forming normal state.

The mode data module is configured to store configuration data of the disk array in each running mode.

The mode change data are data when the switching of the running mode of the disk array is executed, and the configuration data of the disk array in each running mode are stored through the mode data module.

For the specific definition of the disk array redundancy system, please refer to the above definition of the method, which will not be described here. All or part of the modules in the above disk array redundancy system may be implemented by software, hardware, or a combination thereof. The above modules may be embedded in or independent of the processor in the computer device in the form of hardware, and may also be stored in the memory in the computer device in the form of software, so that the processor can call and execute the corresponding operations of the above modules.

The present embodiment provides a computer device, including a memory, a processor, and computer-readable instructions stored on the memory and executable on the processor, and when the processor executes the computer-readable instructions, the steps of the disk array redundancy method are implemented.

Figure 5:
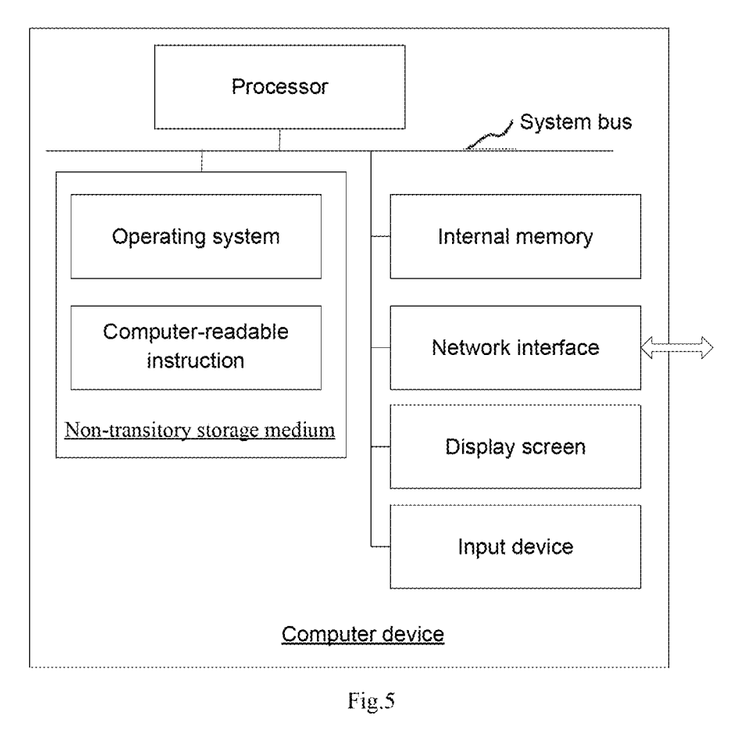
FIG. 5 is a device structure diagram of a computer device in one or more embodiments of the present disclosure.

The computer device may be a terminal, and the internal structure thereof may be as shown in FIG. 5. The computer device includes a processor, a memory, a network interface, a display screen, and an input device, which are connected by a system bus. The processor of the computer device is configured to provide computing and control capabilities. The memory of the computer device includes a non-transitory storage medium and an internal memory. The non-transitory storage medium stores an operating system and computer-readable instructions. The internal memory provides an environment for the running of the operating system and the computer-readable instructions in the non-transitory storage medium. The network interface of the computer device is configured to communicate with an external terminal through a network connection. When the computer-readable instructions are executed by the processor, the disk array redundancy method is implemented. The display screen of the computer device may be a liquid crystal display screen or an electronic ink display screen, and the input device of the computer device may be a touch layer covering the display screen, or a key, a trackball or a touch pad arranged on a shell of the computer device, or an external keyboard, a touch pad or a mouse.

It should be understood by those skilled in the art that the structure shown in FIG. 5 is only a block diagram of a partial structure related to the solution of the present disclosure, and does not constitute a limitation on the computer device to which the solution of the present disclosure is applied. Specific computer device may include more or less components than those shown in the figure, or combine certain components, or have a different arrangement of components.

In one of implementations, a computer device is provided, including a memory, a processor, and computer-readable instructions stored on the memory and executable on the processor, and when the processor executes the computer-readable instructions, the steps of the disk array redundancy method are implemented.

The present embodiment provides a non-transitory computer-readable storage medium on which computer-readable instructions are stored, and when the computer-readable instructions are executed by a processor, the steps of the disk array redundancy method are implemented.

It can be understood by those skilled in the art that all or part of the flow of the method for implementing the above embodiments may be implemented by instructing related hardware through computer-readable instructions, the computer-readable instructions may be stored in a non-transitory computer-readable storage medium, and when the computer-readable instructions are executed, the flows of the above method embodiments may be included. Any reference to memories, storage, databases, or other media used in the embodiments provided by the present disclosure may include a non-volatile and/or volatile memory. The non-transitory memory may include a read only memory (ROM), a programmable ROM (PROM), an electrically programmable ROM (EPROM), an electrically erasable programmable ROM (EEPROM), or a flash memory. The volatile memory may include random access memory (RAM) or external cache memory. As an illustration rather than a limitation, RAM is available in a variety of forms, such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

The technical features of the above embodiments may be combined arbitrarily, and all possible combinations of the technical features in the above embodiments are not described for the sake of brevity. However, as long as there is no contradiction between the combinations of these technical features, they should be considered to be within the scope of the specification.

The above embodiments only represent several embodiments of the present disclosure, and the description thereof is more specific and detailed, but not to be understood as limiting the scope of the present invention patent. It should be noted that, for those of ordinary skill in the art, a number of modifications and improvements may be made without departing from the concept of the present disclosure, which fall within the scope of protection of the present disclosure. Therefore, the scope of protection of the present disclosure patent shall be subject to the appended claims.

What is claimed is:

1. A disk array redundancy method, performed by a disk array redundancy system, and the disk array redundancy system comprises a hardware processor and software modules stored in a memory, the software modules comprise a disk management terminal, a state machine and an agent, the method comprising:

monitoring, by the disk management terminal, a running state of a disk array in real time, and sending abnormal information to the state machine in response to a monitored abnormal running state of the disk array, so as to start a timer for timing according to a preset redundancy duration through the state machine;

sending, by the state machine, a silent request to the agent to enable the agent to execute silent processing so as to suspend input and output operations of the disk array, and switching from a normal running mode of the disk array to a temporary running mode through the agent;

sending, by the state machine, a silent recovery request to the agent to enable the agent to execute silent recovery processing so as to recover the input and output operations of the disk array; and after the silent recovery processing is completed, switching, by the disk management terminal, a running mode of the disk array to the normal running mode through the agent in response to the fact that timing time of the timer does not exceed the preset redundancy duration and the running state of the disk array is recovered to be normal, wherein the abnormal running state of the disk array refers to that a number of disks in an off-line state in the disk array exceeds a number of redundancy disks.

2. The disk array redundancy method according to claim 1, wherein sending abnormal information to a state machine in response to a monitored abnormal running state of the disk array so as to start a timer for timing according to a preset redundancy duration through the state machine comprises:

sending the abnormal information to the state machine in response to the monitored abnormal running state of the disk array, and informing operation and maintenance personnel of the abnormal information; and setting a flag state of the state machine as a disc forming abnormal state, starting the timer for timing according to the preset redundancy duration, and informing the operation and maintenance personnel that the timing is started.

3. The disk array redundancy method according to claim 1, wherein the disk array is provided with two redundancy disks, and the disk array is in an abnormal state in response to the fact that the number of off-line disks in the disk array exceeds 2.

4. The disk array redundancy method according to claim 1, wherein the silent processing is to suspend input and output operations of the disk array in a current running mode to enable the agent to execute the silent processing, comprising:
enabling the agent to suspend the input and output operations of the disk array in the normal running mode.

5. The disk array redundancy method according to claim 1, wherein the silent recovery request is to execute the input and output operations of the disk array according to a running mode to be switched to enable the agent to execute the silent recovery processing, comprising:
enabling the agent to execute the input and output operations of the disk array according to the temporary running mode.

6. The disk array redundancy method according to claim 1, wherein switching a running mode of the disk array to the normal running mode comprises:
recovering normal input and output operations of the disk array, recovering a normal service of the disk array, and improving redundancy capabilities of the disks.

7. The disk array redundancy method according to claim 2, wherein after sending the abnormal information to the state machine, the method further comprises:
informing the operation and maintenance personnel of the abnormal information, so that the operation and maintenance personnel perform troubleshooting to recover the off-line disks in the disk array; and
printing a log to save operation information.

8. The disk array redundancy method according to claim 2, wherein a running mode to which the disk array needs to be switched is judged by a relationship between a timing duration of the timer and the preset redundancy duration.

9. The disk array redundancy method according to claim 1, wherein sending, by the state machine, a silent request to the agent to enable the agent to execute silent processing so as to suspend input and output operations of the disk array, and switching from a normal running mode of the disk array to a temporary running mode through the agent comprises:
sending the silent request to the agent, and preparing mode change data by the state machine;
executing, by the agent, the silent processing to enable a host to suspend issuing the input and output operations, adding the issued input and output operations to a silent queue, and sending a silent operation completion message to the state machine after the agent completes executing the silent processing; and
sending, by the state machine, the mode change data to the agent, and switching, by the agent, the running mode of the disk array from the normal running mode to the temporary running mode according to the mode change data.

10. The disk array redundancy method according to claim 2, wherein sending, by the state machine, a silent recovery request to the agent to enable the agent to execute silent recovery processing so as to recover the input and output operations of the disk array comprises:
sending a message of switching from the normal running mode of the disk array to the temporary running mode to the state machine, and sending, by the state machine, the silent recovery request to the agent; and
executing, by the agent, the silent recovery processing to recover the input and output operations in the silent queue to a normal queue, enabling the host to continue to issue the input and output operations, and sending a message of recovering the input and output operations to be normal in the temporary running mode to the state machine after the input and output operations are recovered to be normal in the temporary running mode.

11. The disk array redundancy method according to claim 10, wherein after sending a message of recovering the input and output operations to be normal in the temporary running mode to the state machine, the method further comprises:
acquiring the running state of the disk array, and switching from the temporary running mode of the disk array to the normal running mode through the agent in response to the fact that the running state of the disk array is recovered to be normal and the timing time of the timer does not exceed the preset redundancy duration; and
switching from the temporary running mode of the disk array to an off-line running mode through the agent in response to the fact that the running state of the disk array is not recovered to be normal or the timing time of the timer exceeds the preset redundancy duration.

12. The disk array redundancy method according to claim 11, wherein switching from the temporary running mode of the disk array to the normal running mode through the agent comprises:
sending a silent request to the agent, and preparing mode change data by the state machine;
executing, by the agent, silent processing to enable a host to suspend issuing input and output operations, adding the issued input and output operations to the silent queue, and sending a silent operation completion message to the state machine after the agent completes executing the silent processing; and
sending, by the state machine, the mode change data to the agent, and switching, by the agent, the running mode of the disk array from the temporary running mode to the normal running mode according to the mode change data.

13. The disk array redundancy method according to claim 12, wherein switching from the temporary running mode of the disk array to the normal running mode through the agent further comprises:
sending a message of switching from the temporary running mode of the disk array to the normal running mode to the state machine, and sending, by the state machine, a silent recovery request to the agent;
executing, by the agent, silent recovery processing to recover the input and output operations in the silent queue to a normal queue, and enabling the host to continue issuing input and output operations, and sending a message of recovering the input and output operations to be normal in the normal running mode to the state machine after the input and output operations are recovered to be normal in the normal running mode; and
setting a flag state of the state machine as a disc forming normal state.

14. The disk array redundancy method according to claim 11, wherein switching from the temporary running mode of the disk array to an off-line running mode through the agent comprises:
sending a silent request to the agent, and preparing mode change data by the state machine;

executing, by the agent, silent processing to enable the host to stop issuing input and output operations, adding the issued input and output operations into the silent queue, and sending a silent operation completion message to the state machine after the agent completes executing the silent processing; and sending, by the state machine, the mode change data to the agent, and switching, by the agent, the running mode of the disk array from the temporary running mode to the off-line running mode according to the mode change data.

15. The disk array redundancy method according to claim 14, wherein switching from the temporary running mode of the disk array to an off-line running mode through the agent further comprises:

sending a message of switching from the temporary running mode of the disk array to the off-line running mode to the state machine, and sending, by the state machine, a silent recovery request to the agent;

executing, by the agent, silent recovery processing, returning all input and output operation requests to the host, and disconnecting a main link of the host; and reporting a disc forming abnormal state of the state machine to the operation and maintenance personnel.

16. The disk array redundancy method according to claim 1, wherein before starting a timer for timing according to a preset redundancy duration, the method further comprises:

determining a preset redundancy duration database according to a fault type of the disk array, an input and output operation processing duration and a disk insertion-removal duration.

17. The disk array redundancy method according to claim 16, wherein before starting a timer for timing according to a preset redundancy duration, the method further comprises:

acquiring a corresponding preset redundancy duration from the preset redundancy duration database according to the fault type.

18. A computer device, comprising one or more memories, one or more processors, computer-readable instructions stored on the one or more memories and executable on the one or more processors, and software modules stored in the one or more memories, the software modules comprising a disk management terminal, a state machine and an agent, wherein the one or more processors are configured to execute the computer-readable instructions to perform a method, comprising:

monitor, by the disk management terminal, a running state of a disk array in real time, and send abnormal information to the state machine in response to a monitored abnormal running state of the disk array, so as to start a timer for timing according to a preset redundancy duration through the state machine;

send, by the state machine, a silent request to the agent to enable the agent to execute silent processing so as to suspend input and output operations of the disk array, and switch from a normal running mode of the disk array to a temporary running mode through the agent;

send, by the state machine, a silent recovery request to the agent to enable the agent to execute silent recovery processing so as to recover the input and output operations of the disk array; and after the silent recovery processing is completed, switch, by the disk management terminal, a running mode of the disk array to the normal running mode through the agent in response to the fact that timing time of the timer does not exceed the preset redundancy duration and the running state of the disk array is recovered to be normal, wherein the abnormal running state of the disk array refers to that a number of disks in an off-line state in the disk array exceeds a number of redundancy disks.

19. A non-transitory computer-readable storage medium, wherein the non-transitory computer-readable storage medium stores computer-readable instructions which, when executed by one or more processors, cause the one or more processors to:

monitor a running state of a disk array in real time, and send abnormal information to a state machine in response to a monitored abnormal running state of the disk array, so as to start a timer for timing according to a preset redundancy duration through the state machine;

send, by the state machine, a silent request to an agent to enable the agent to execute silent processing so as to suspend input and output operations of the disk array, and switch from a normal running mode of the disk array to a temporary running mode through the agent;

send, by the state machine, a silent recovery request to the agent to enable the agent to execute silent recovery processing so as to recover the input and output operations of the disk array; and after the silent recovery processing is completed, switch a running mode of the disk array to the normal running mode through the agent in response to the fact that timing time of the timer does not exceed the preset redundancy duration and the running state of the disk array is recovered to be normal, wherein the abnormal running state of the disk array refers to that a number of disks in an off-line state in the disk array exceeds a number of redundancy disks.

* * * * *